May 31, 1927.

G. N. SIMPSON

POWER MECHANISM

Filed Oct. 30, 1922

1,630,809

Inventor:
George N. Simpson,

Patented May 31, 1927.

1,630,809

UNITED STATES PATENT OFFICE.

GEORGE N. SIMPSON, OF CHICAGO, ILLINOIS.

POWER MECHANISM.

Application filed October 30, 1922. Serial No. 597,868.

This invention relates to improvements in power mechanism; and for the purpose of illustration is here shown as applied to an air brake especially adapted for use on a motor vehicle driven by an internal combustion engine. It is obvious, however, that, without detracting from the spirit of the invention, the mechanism may be used for controlling other kinds of air brakes or devices.

The invention as embodied in the device shown herein, makes use of the partial vacuum in the intake manifold of the internal combustion engine, in obtaining power to apply to the brakes. The device is so constructed that it may be easily attached to a motor vehicle of ordinary construction. It is also simple in design and operation, and strong and rugged in construction. The device is also made so that the ordinary control of the brakes through the brake pedal remains intact, thus permitting the brakes to be set in the ordinary manner by the foot, if, for any reason, the air cylinder of the device is not in operation. Other features and advantages of my invention will appear more fully as I proceed with my specification.

Figure 1:
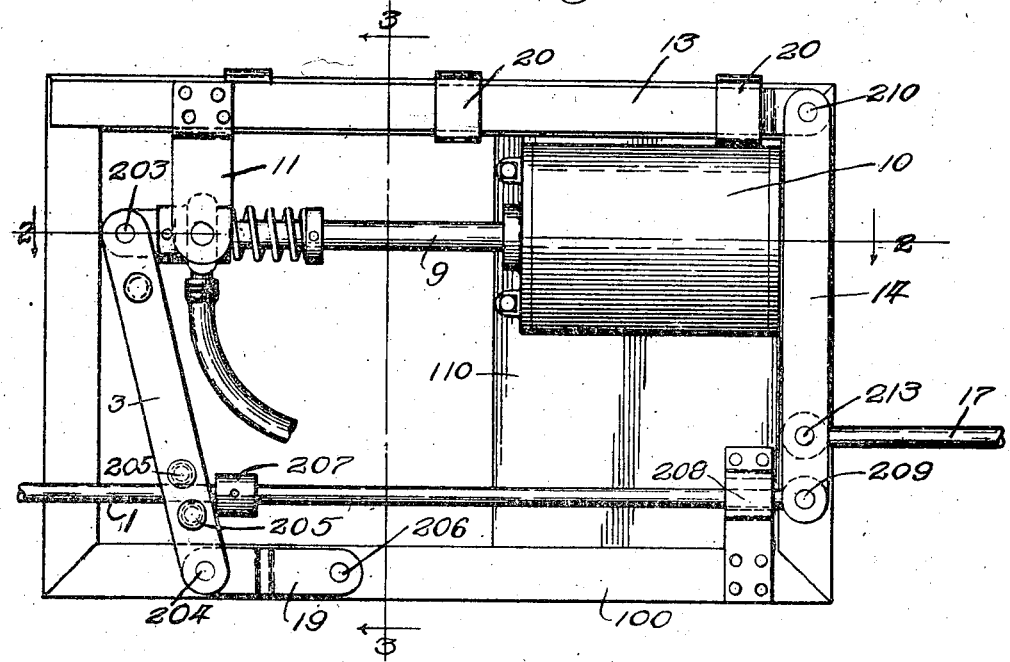
Figure 2:
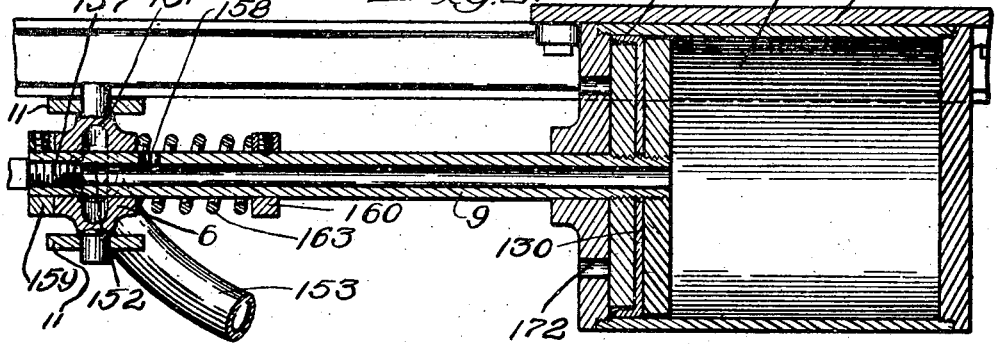
Figure 3:
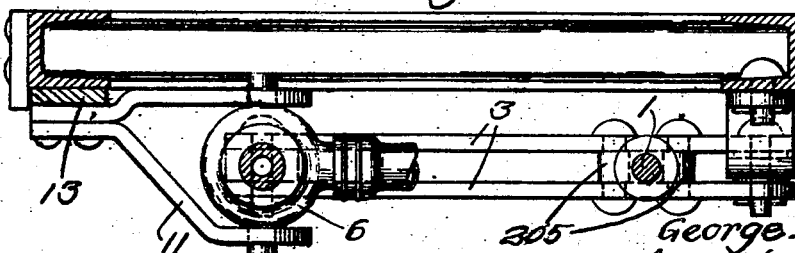

In that form of device embodying the features of my invention, shown in the accompanying drawings, Figure 1 is a bottom plan view, Fig. 2 is a view on an enlarged scale taken as indicated by the line 2—2 of Fig. 1, and Fig. 3 is a view taken as indicated by the line 3—3 of Fig. 1.

As shown in the drawings, 100 indicates a rectangular frame made of channel irons suitably joined in any desired manner, as by welding, at the corners. Fastened to the upper side of the frame 100 at one end is a rectangular plate 110, as shown. The plate 110 carries a cylinder 10 provided with a piston 130 and a hollow piston rod 9.

1 indicates a brake rod or power rod leading to the brakes (not shown) either directly or through any suitable levers or other connections. Slidably mounted at one side of the frame 100 is a valve rod 13 adapted to reciprocate in the guides 20. The valve rod 13 is provided with a forked valve-operating bracket 11 carrying a valve 6 slidably mounted on the piston rod 9. The valve 6 is provided with an internal annular recess 151 having an opening 152 communicating with a flexible hose connection 153, which leads to the intake manifold of the internal combustion engine (not shown). The end of the hollow piston rod 9 is blocked, as indicated by 157, and this rod is provided with a port 158 near its end. A collar 159 on the piston rod limits the forward movement of the valve 6; and behind this valve is a collar 160. Between the collar 160 and the valve 6 is placed a spiral spring 163 to exert a forward pressure on the valve 6 with respect to the piston rod 9. When the valve 6 is at the limit of its forward movement on the piston rod 9, as shown in Fig. 2, the port 158 is uncovered by the valve. When in this position, there is no outlet from the annular recess 151 except through the hose 153; and consequently no air will be drawn through such hose into the intake manifold of the engine. If, however, the valve 6 is moved backwardly on the piston rod 9 against the compression of the spring 163 until the recess 151 comes over the port 158, air will be sucked out of the cylinder 10 behind the piston 130 through the hollow piston rod, causing atmospheric pressure on the front of the piston 130 (entering the cylinder through the vents 172) to move the piston backwardly in the cylinder.

The end of the piston rod 9 is pivotally connected at 203 to one end of a double lever 3. The other end of the double lever 3 is pivotally connected at 204 to a short arm 19, which in turn is pivoted at 206 to one of the frame members 100. The purpose of the arm 19 is to permit the piston rod 9 to remain in alinement during its reciprocations. The double lever 3 is provided near the pivot point 204 with two pins 205 between which the brake rod 1 passes. Just behind the double lever 3, mounted on the brake rod 1, is a collar 207, so that backward movement of the piston rod 9 will operate through the double lever 3 to move the brake rod or power rod 1 causing it to perform such operation as may be desired, such as, for example, the tightening of brakes on a motor vehicle. The ratio of the double lever 3 is here shown as substantially 4 to 1, in order to give a leverage in favor of the piston rod 9. The brake rod 1 operates through a guide 208 and just behind this guide the brake rod is pivotally connected at 209 to one end of a link 14, the other end of which is pivotally connected at 210 to the back-end of the valve rod 13. 17 indicates the brake pedal rod or control rod which is pivotally attached at 213 to the link 14. The other end of the brake rod 17 (not shown) is connected directly or through any suitable levers or other connections to the ordinary foot brake pedal (not shown) of the motor vehicle.

The operation of the device is as follows. The flexible hose 153 is led by any suitable connections to the intake manifold of the internal combustion engine. There is consequently formed in said hose, at all times, when the engine is running, a partial vacuum. It is obvious that, if desired, any other suitable means for maintaining a partial vacuum may be utilized. When the brake pedal rod 17 is moved by operation of the regular foot-pedal in the usual manner to set the brakes (to the right as viewed in Fig. 1) such movement, operating through the link 14, serves to move the valve rod 13, which in turn slides the valve 6 against the tension of the spring 163 until the recess 151 registers with the port 158. When this happens the partial vacuum in the tube 153 and valve 6 is transmitted through the hollow piston rod 9 into the cylinder 10 behind the piston 130. Air at atmospheric pressure then enters through the port 172 and moves the piston 130 back (to the right as viewed in Fig. 2). This movement of the piston, operating through the double lever 3 and against the collar 207 serves to move the brake rod 1 and set the brakes. It will be noted that if, for any reason, the engine is not running, so that there is no partial vacuum available, so that the piston 130 will not work, the brakes can be set in the usual manner by operation of the foot-pedal. When this happens, the operation is as follows. The first movement of the rod 17 causes movement of the valve 6 to register with the port 158 in the usual manner. There being no partial vacuum, the piston rod 9 does not move. Further movement of the rod 17 by means of the foot, then operates through the short end of the link 14 directly on the brake rod 1 to set the brakes, the collar 207 moving away from the double lever 3. The brake rod 1 is mounted rather loosely in the guide 208 in order to permit this operation. The pivot point 213 is located in the link 14 substantially one-sixth of the distance from the pivot point 209. This leverage, however, may be made as desired, and should be so constructed that with normal operation, the pull of the rod 17 on the link 14 will operate to move the valve 6 into registry with the port 158 before the brakes are completely set; so that the piston rod 9 will operate through the double lever 3 against the collar 207 to cause the brakes to be set by air pressure. The double lever 3 is constructed to give the desired leverage in favor of the piston rod 9. As here shown, it is about 4 to 1.

It is to be noted that in the operation of the device, movement of the rod 17 operates on link 14 to move the valve 6 and also to move the brake rod. A slight movement of the brake rod, however, is permitted without applying the brakes since the brakes do not ordinarily come on until near the end of the stroke of the brake rod. At any rate, the very first movement of the brake rod is very easily permitted. As soon as the valve registers with the ports 158, the air pressure operates to apply the brakes. As the piston 9 moves, it is obvious that the lever 3 will operate on the brake rod and this in turn will permit the links 14 to move to the right (as viewed in Fig. 1) thus permitting the rod 13 to move to the right so that the valve 6 will follow up the movement of the piston to keep the recess 151 in registry with the port 158.

It is obvious that the brake rod 1 may be used to operate any other mechanism; and consequently in the claims I am referring to this rod as the power rod, since it is the rod that delivers the power. It is likewise true that the brake pedal rod 17 may be connected to any other operating means besides the foot-pedal; and since it is the rod that controls the power mechanism, I am referring to it in the claims as the control rod.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. A device of the character described comprising an air cylinder having a piston therein provided with a hollow piston rod, a valve slidably mounted on the piston rod, a power rod, a lever connecting the piston rod to the power rod, a link connected to the sliding valve and the power rod, and a control rod connected to the link.

2. A device of the character described comprising an air cylinder having a piston therein provided with a hollow piston rod, a valve slidably mounted on the piston rod, a power rod connected to the piston rod, and a control rod connected to the sliding valve and the power rod.

3. A device of the character described comprising an air cylinder having a piston therein provided with a hollow piston rod, a valve slidably mounted on the piston rod, a power rod, a lever connecting the piston rod to the power rod, and a control rod connected to the sliding valve and the power rod.

4. A device of the character described comprising an air cylinder having a piston therein provided with a hollow piston rod, a valve slidably mounted on the piston rod, a double lever connected to the piston rod, a power rod extending between the parts of the double lever, a collar on the power rod back of the double lever, a link connected to the sliding valve and the power rod, and a control rod connected to the link.

5. A device of the character described comprising an air cylinder having a piston therein provided with a hollow piston rod, a valve slidably mounted on the piston rod, a double lever connected to the piston rod, a power rod extending between the parts of the double lever, a collar on the power rod back of the double lever, and a control rod connected to the sliding valve and to the power rod.

6. A device of the character described comprising an air cylinder having a piston therein provided with a hollow piston rod, a port near the end of the piston rod, a valve slidably mounted on the piston rod having an internal recess and adapted to slide on the piston rod to cause said internal recess to register with said port, a connection extending to said valve adapted to be connected to means for exhausting air, a power rod, means for connecting the piston to the power rod, a control rod, and means for connecting the control rod to the sliding valve and to the power rod.

7. A device of the character described comprising an air cylinder having a piston therein provided with a hollow piston rod, a port near the end of the piston rod, a valve slidably mounted on the piston rod having an internal recess and adapted to slide on the piston rod to cause said internal recess to register with said port, a connection extending to said valve adapted to be connected to means for exhausting air, a power rod, means for connecting the piston to the power rod, and a control rod connected to the sliding valve and to the power rod.

8. A device of the character described comprising an air cylinder having a piston therein provided with a hollow piston rod, a valve slidably mounted on the piston rod, a double lever connected to the piston rod, a power rod extending between the parts of the double lever, a collar on the power rod back of the double lever, and a control rod connected to the sliding valve and to the power rod.

9. A device of the character described comprising an air cylinder having a piston therein, a piston rod connected to the piston, an inlet to the cylinder, a valve controlling the inlet to the cylinder, a power rod, a connection between the piston rod and the power rod, and a control rod connected to the valve and the power rod.

10. A device of the character described comprising an air cylinder having a piston therein provided with a hollow piston rod, a valve slidably mounted on the piston rod, a spring connection between the valve and the piston rod, a power rod, a lever connecting the piston rod to the power rod, a link connected to the sliding valve and the power rod, and a control rod connected to the link.

11. A device of the character described comprising an air cylinder having a piston therein provided with a hollow piston rod, a valve slidably mounted on the piston rod, a spring connection between the valve and the piston rod, a power rod connected to the piston rod, and a control rod connected to the sliding valve and the power rod.

12. A device of the character described comprising an air cylinder having a piston therein provided with a hollow piston rod, a valve slidably mounted on the piston rod, a spring connection between the valve and the piston rod, a power rod, a lever connecting the piston to the power rod, and a control rod connected to the sliding valve and the power rod.

13. A device of the character described comprising an air cylinder having a piston therein provided with a hollow piston rod, a valve slidably mounted on the piston rod, a spring connection between the valve and the piston rod, a double lever connected to the piston rod, a power rod extending between the parts of the double lever, a collar on the power rod back of the double lever, a link connected to the sliding valve and the power rod, and a control rod connected to the link.

14. A device of the character described comprising an air cylinder having a piston therein provided with a hollow piston rod, a valve slidably mounted on the piston rod, a spring connection between the valve and the piston rod, a double lever connected to the piston rod, a power rod extending between the parts of the double lever, a collar on the power rod back of the double lever, and a control rod connected to the sliding valve and to the power rod.

15. A device of the character described comprising an air cylinder having a piston therein provided with a hollow piston rod, a port near the end of the piston rod, a valve slidably mounted on the piston rod having an internal recess and adapted to slide on the piston rod to cause said internal recess to register with said port, spring means operating to normally hold said valve with its internal recess out of registry with said port, a connection extending to said valve adapted to be connected to means for exhausting air, a power rod, means for connecting the piston to the power rod, a control rod, and means for connecting the control rod to the sliding valve and to the power rod.

16. A device of the character described comprising an air cylinder having a piston therein provided with a hollow piston rod, a port near the end of the piston rod, a valve slidably mounted on the piston rod having an internal recess and adapted to slide on the piston rod to cause said internal recess to register with said port, spring means operated to normally hold said valve with its internal recess out of registry with said port, a connection extending to said valve adapted to be connected to means for exhausting air, a power rod, means for connecting the piston to the power rod, and a control rod connected to the sliding valve and to the power rod.

17. A device of the character described comprising an air cylinder having a piston therein provided with a hollow piston rod, a valve slidably mounted on the piston rod, a spring connection between the valve and the piston rod, a power rod connected to the piston rod, and a control rod connected to the sliding valve and to the power rod.

Witness my hand and seal this 24 day of October, 1922.

GEORGE N. SIMPSON